(12) United States Patent
Trakinat et al.

(10) Patent No.: US 11,265,679 B2
(45) Date of Patent: Mar. 1, 2022

(54) SYSTEM AND METHOD FOR REGISTRATION OF A NETWORK ENABLED LOCATION TRACKING DEVICE

(71) Applicant: T-Mobile USA, Inc., Bellevue, WA (US)

(72) Inventors: Jean Cheryl Trakinat, Ewa Beach, HI (US); Scott Francis Migaldi, Cary, IL (US); Karri Mikael Kuoppamaki, Redmond, WA (US); Mark L. Younge, Golden, CO (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/908,856

(22) Filed: Jun. 23, 2020

(65) Prior Publication Data

US 2021/0400437 A1    Dec. 23, 2021

(51) Int. Cl.
| | |
|---|---|
| *H04W 4/029* | (2018.01) |
| *H04W 12/06* | (2021.01) |
| *H04W 4/80* | (2018.01) |
| *G08B 21/24* | (2006.01) |
| *H04W 4/50* | (2018.01) |
| *H04M 1/72412* | (2021.01) |

(52) U.S. Cl.
CPC ............ *H04W 4/029* (2018.02); *G08B 21/24* (2013.01); *H04M 1/72412* (2021.01); *H04W 4/50* (2018.02); *H04W 4/80* (2018.02); *H04W 12/06* (2013.01)

(58) Field of Classification Search
CPC ......... H04W 4/029; H04W 4/80; H04W 4/50; H04W 12/06; H04M 1/72412; G08B 21/24
See application file for complete search history.

(56) References Cited

U.S. PATENT DOCUMENTS

| | | | |
|---|---|---|---|
| 10,701,067 B1* | 6/2020 | Ziraknejad | ............ G06F 21/6209 |
| 2013/0225161 A1* | 8/2013 | Chhabra | ................ H04W 36/14 |
| | | | 455/426.1 |
| 2014/0370879 A1* | 12/2014 | Redding | ............ H04M 3/42178 |
| | | | 455/419 |
| 2018/0084587 A1* | 3/2018 | Noor | ...................... H04W 76/50 |
| 2018/0160271 A1* | 6/2018 | Vutukuri | ............. H04W 12/069 |
| 2020/0107264 A1* | 4/2020 | Ayoub | .............. H04W 52/0212 |

* cited by examiner

*Primary Examiner* — Kenneth T Lam
(74) *Attorney, Agent, or Firm* — Lee & Hayes, P.C.

(57) ABSTRACT

Systems and methods for registering a location tracking device affixed to an item or other merchandise with a cellular or mobile network provider associated with the purchaser are described herein. In some cases, user equipment in physical proximity to the location tracking device may establish a connection with the location tracking device to facilitate the registration process between the network provider and the location tracking device. Once the registration is complete, the location tracking device may establish a direct connection with the cellular or mobile network of the network provider such that the network provider is able to monitor the location of the location tracking device.

18 Claims, 7 Drawing Sheets

SYSTEM AND METHOD FOR REGISTRATION OF A NETWORK ENABLED LOCATION TRACKING DEVICE

BACKGROUND

With the proliferation of wireless devices and cellular and/or Wi-Fi networks the ability to track or obtain a location of a connected device is becoming more and more widespread. Similarly, today, object or item location tracking devices that can be affixed to a corresponding item to track and/or locate the corresponding object when lost or stolen are becoming more and more common place. However, most location tracking devices today rely on the proximity and computing resources of a mobile device nearby the lost or stolen item. Unfortunately, often when an item becomes lost or stolen, the item is not within the proximity of a mobile device associated with the owner, thereby reducing the value of conventional location tracking devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
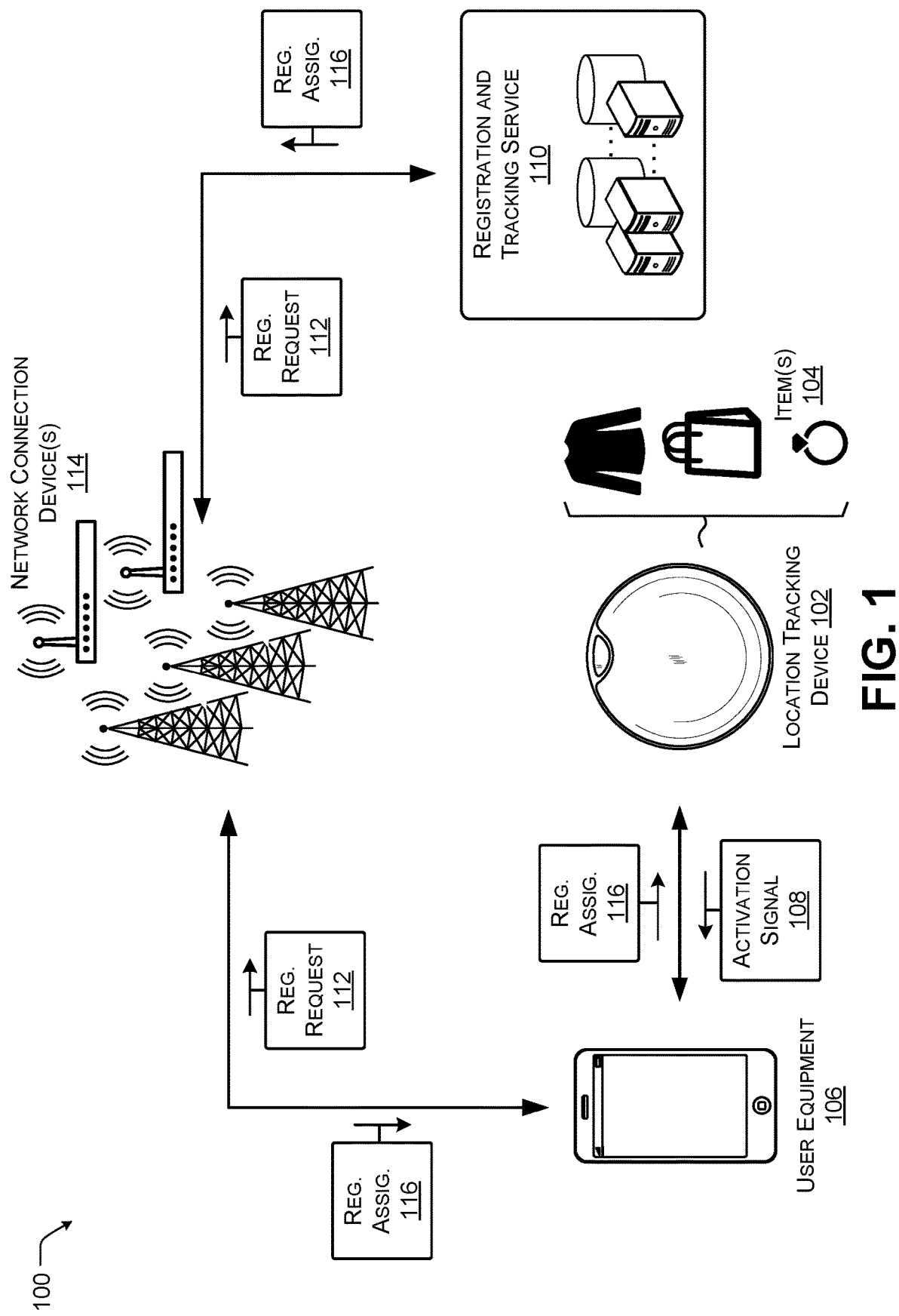
FIG. 1 is an example of a communications network for registration a location tracking device, in accordance with some examples of the present disclosure.

Discussed herein are systems and methods associated with registering a location tracking device embedded or affixed to an item with a cellular or mobile network associated with the user or purchaser. For example, the location tracking device may be embedded, coupled, affixed, or otherwise attached to the item during manufacturing, such that the location tracking device cannot be removed from the item without causing damage to or rendering the item inoperable. The location tracking device may be a low power device that is configured to directly connect and communicate with one or more cellular or mobile network upon activation and completion of a one-time registration process.

In some implementations, once an item equipped with a location tracking device is purchased, a user may register the location tracking device to a cellular or mobile network of the user's choice via an activation and registration process. For example, the user may activate the location tracking device via a one-time actuatable or mechanical trigger, such as a pullable or tearable tag that, when removed, couples a power source to one or more components of the location tracking device. Upon activation, the location tracking device may enter a registration mode. During the registration mode, the location tracking device may attempt to wirelessly or communicatively couple (e.g., pair) to nearby user equipment (UE), such as electronic devices, smart phones, mobile devices, notebooks devices, computers, etc., via a short-range communication protocol.

The user may then initiate the registration of the location tracking device to an account associated with the user's cellular or mobile network provider. For instance, the user may register the location tracking device via an application associated with the cellular or mobile network provider or with the location tracking device itself. The UE may then send, via a cellular network, a registration request to a cloud-based registration and tracking service associated with the cellular or mobile network. The cloud-based registration and tracking service may then generate a unique identifier or device identification credentials for the location tracking device and add the location tracking device as an authorized device to the account of the user. In some cases, the device identification credentials may be generated to a fixed length identifier and may be formed based on combination of one or more of a device identifier, account identifier, and/or a registration device identifier. For example, the device identification credentials may include a unique identifier concatenated with an account number (or portion of an account number).

Once the location tracking device is associated with the user account and/or the network, the cloud-based registration and tracking service may transmit the device identification credentials as well as network access credentials to the UE. In some cases, the network access credentials may be unique to the location tracking device and/or may differ from the user's account name and password to prevent theft of and unauthorized access to the account via the user's account name and password.

The UE may assign using the short-range wireless communication connection, the device identification credentials to the location tracking device and provide the network access credentials. In some implementations, the device identification credentials and/or the network access credentials may be stored on the location tracking device. The location tracking device may also establish a direct wireless communication connection to the cellular or mobile network using the device identification credentials and the network access credentials. Once the direct wireless communication connection is established, a position or location of the location tracking device may be monitored and/or determined upon request by the cloud-based registration and tracking service without the location tracking device being in physical proximity to a mobile device of the user. For example, a physical position or location of the location tracking device may be triangulated using signal strength associated with a signal generated by the location tracking device and detected by one or more towers or receiving stations associated with the cellular or mobile network provider. Additionally, a physical position or location may be determined based at least in part on mobile crowd sourcing techniques, GNSS, terrestrial beaconing, and even through a host device via local near field link. The complexity of the device is what would dictate the location service capability.

In some implementations, the cloud-based registration and tracking service may determine and provide the location of the location tracking device in response to receiving a request from a mobile device associated with the account or user. If the location tracking device cannot be located by the cloud-based registration and tracking service, the cloud-based registration and tracking service may provide a last known location or estimated location in response to receiving the request from the mobile device.

In another implementation, the cloud-based registration and tracking service may actively monitor the physical location of the location tracking device. In these implementations, the cloud-based registration and tracking service may determine when the location tracking device (and thereby the item attached the location tracking device) exits a region typically associated with the item (such as the home of the user) or if the item remains stationary for an unusual period of time. In either situation, the cloud-based registration and tracking service may determine the item may be lost or stolen and send an alert or notification to the UE to inform the user that the item associated with the location tracking device may be lost or stolen. In this manner, the cloud-based registration and tracking service may actively monitor the items associated with the location tracking devices of the user.

FIG. 1 is an example of a communications network for registration a location tracking device 102, in accordance with some examples of the present disclosure. As discussed above, the location tracking device 102 may be affixed to an item 104, such as clothing, accessories, vehicles, or other high value merchandise, at the time of manufacturing. In some cases, the location tracking device 102 may be affixed to the item 104 in a manner such that the location tracking device 102 cannot be removed without damage to the item 104 (e.g., permanently affixed). In some implementations, the location tracking device 102 may be disabled until activated by the user/purchaser of the item 104.

When ready (such as at home after shopping), the user may activate the location tracking device 102 on the item 104. For example, the user may activate the location tracking device 102 via a onetime actuatable or mechanical trigger, such as a pull tag that when removed couples a power source of the location tracking device 102 to one or more operational components of the location tracking device 102, such as a control circuit. In other examples, the location tracking device 102 may be equipped with one or more buttons, such as a pairing button that causes the location tracking device 102 to become discoverable by nearby UE 106 (e.g., wireless enabled devices).

Upon activation, the location tracking device 102 may enter a registration mode. During the registration mode, the location tracking device 102 may attempt to wirelessly or communicatively couple (e.g., pair) with nearby UE 106 via a short-range communication protocol (e.g., Wi-Fi, Bluetooth®, etc.). In one example, the location tracking device 102 may transmit or broadcast an activation signal 108 that is detectable by the nearby (e.g., within a threshold distance of the location tracking device 102) UE 106.

The UE 106 may then notify a user as to the presence of and prerequisite to register the location tracking device 102 prior to a cloud-based registration and tracking service 110 monitoring or tracking a location or position of the item 104 via the location tracking device 102. In some instances, the UE 106 may present a registration application via a display of the UE 106. In some cases, the registration application may be accessible to the UE 106 as a webhosted application, while in other cases, the UE 106 may prompt the user to download or otherwise install an application on the UE 106 to complete the registration process and/or monitor the location of the item 104.

The user may then initiate the registration of the location tracking device 102 to an account associated with the user's cellular or mobile network provider. For instance, the user may cause the UE 106 to transmit a registration request to the cloud-based registration and tracking service 110 via one or more network connection devices 114 associated with the user's cellular or mobile network provider.

The registration and tracking service 110 may receive the registration request from the UE 106 and determine an account associated with the user and/or the UE 106 with the cellular or mobile network provider. The registration and tracking service 110 may also generate unique device identification credentials for the location tracking device 102 and add the location tracking device 102 as an authorized device under the account of the user. In some cases, the device identification credentials may be generated as a fixed length identifier and may be formed based on combination of one or more of a device identifiers, account identifier, and/or a registration device identifier. For example, the location tracking device 102 may include a unique identifier that is provided as part of the registration request 112 to the registration and tracking service 110. The account identifier may be associated with the account of the user, and the registration device identifier may be an identifier associated with the UE 106.

In other examples, the user may enter the device identification credentials via the user interface of the UE 106 and the device identification credentials may be provided to the registration and tracking service 110 as part of the request 112. In other cases, the UE 106 or the application operating on the UE 106 may be configured to assign the device identification credentials and send the device identification credentials to the registration and tracking service 110 as part of the request 112. In one particular example, the device identification credentials may include a unique identifier provided as part of the registration request 112 concatenated with an account number (or portion of an account number). In other particular example, the device identification credentials may be based on a type and number of the item 104. In still other examples, the item 104 may have a pre-assigned identifier, such as an identifier associated with a serial number. In one specific example, the identifier may be derived from a biometric identifier associated with the user or owner of the item 104.

In some examples, the item 104 may undergo a transfer of ownership. In these examples, the device identification credentials of the item 104 may be transfer between accounts of the mobile network provider or may be transferred between different network providers (e.g., the network provider of the original owner differs from the network provider of the new owner). In one example, the new owner may utilize their user equipment to again register the item 104 or the location tracking device 102 with their network, as discussed herein. Additionally, in this example, the registration and tracking service 110 may be aware that the location tracking device 102 is already registered and either transfer the registration and/or remove the registration from the original account and re-register the location tacking device 102 with the new user's account. In some cases, the original owner may send a notice to the registration and tracking service 110 to remove the location tracking device 102 from the user's account, such as in the instance, that the new owners fails to register the device 102.

Once the location tracking device 102 is added to the user's account by the registration and tracking service 110, the registration and tracking service 110 may transmit a registration assignment 116 to the UE 106 via the network connection devices 114. The registration assignment 116 may include the device identification credentials as well as network access credentials. In some cases, the network access credentials may be unique to the location tracking device 102 and/or may differ from the user's account name and password to prevent theft of and unauthorized access to the account via the user's account name and password.

The UE 106 may then assign or transmit the registration assignment 116 (e.g., the device identification credentials and the network access credentials) to the location tracking device 102 using the short-range wireless communication connection. In some implementations, the device identification credentials and/or the network access credentials may be stored on the location tracking device 102. The location tracking device 102 may establish a direct wireless communication connection to the cellular or mobile network via the network connection devices 114 using the device identification credentials and the network access credentials.

Once the direct wireless communication connection is established, a position or location of the location tracking device 102 may be monitored and/or determined upon request by the registration and tracking service 110 without the location tracking device 102 being in physical proximity to the UE 106, as discussed in more detail below with respect to FIG. 2. For example, a physical position or location of the location tracking device 102 may be triangulated using signal strength associated with a signal generated by the location tracking device 102 and detected by one or more network connection devices 114 associated with the cellular or mobile network provider.

Figure 2:
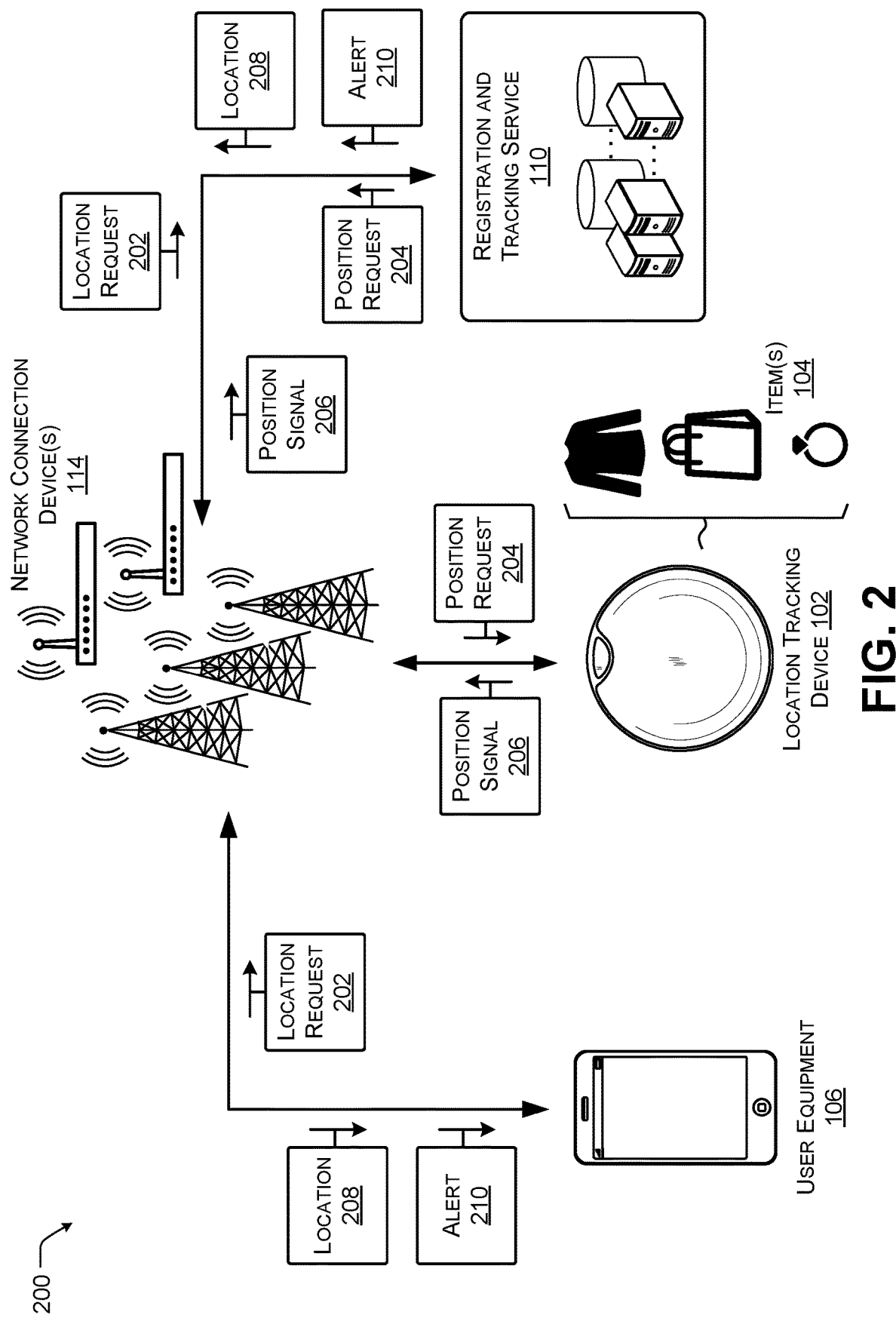
FIG. 2 is an example of a communications network for monitoring a location tracking device, in accordance with some examples of the present disclosure.

FIG. 2 is an example of a communications network for monitoring the location tracking device 102, in accordance with some examples of the present disclosure. As discussed above, the location tracking device 102 may be coupled or affixed to the item 104 (such as clothing, accessories, vehicles, or other high value merchandise) in a manner such that the location tracking device 102 cannot be removed without damage to the item 104.

In the current example, the location tracking device 102 may already be registered with an account of the user of the UE 106 associated with the user' cellular or mobile network provider. In this manner, the location tracking device 102 may be in direct wireless communication with the network connection device 114 associated with the cellular or mobile network provider as well as the cloud-based registration and tracking service 110. In some examples, the UE 106 may also have access to or be equipped with a downloadable application that allows the user to track the position or location of the location tracking device 102 via the registration and tracking service 110.

In some implementations, the registration and tracking service 110 may determine and provide the location of the location tracking device 102 in response to receiving a location request 202 from the UE 106 associated with the account or user. For example, the user may generate a location request 202 for the specific item 104 associated with the location tracking device 102 upon discovery that the item 104 is lost or if the user is experiencing difficulty in locating the item 104. In some cases, the user may select the lost item 104 or the location tracking device 102 associated with the lost item 104 from a list of items 104 with active location tracking devices 102 to generate the location request 202. In other cases, the user may type or otherwise enter an identifier associated with the lost item 104 to generate the location request 202.

The location request 202 may be received by the registration and tracking service 110 via the network associated with the network connection devices 114. In response to the location request 202, the registration and tracking service 110 may generate a position request 204 to send to the location tracking device 102 via the network connection devices 114. The location tracking device 102 may respond by providing a position signal 206 back to the registration and tracking service 110. In some cases, the position signal 206 may be detected by one or more of the network connection devices 114 and the registration and tracking service 110 may receive the position signal 206 as well as an estimated direction or location or time stamp from each of the network connection devices 114 that detected or received the position signal 206. The registration and tracking service 110 may then determine an estimated location of the item 104 based at least in part on a known position of each of the network connection device 114, the estimated direction or location of the location tracking device 102 from each network connection device 114, and/or the time stamps associated with each network connection device 114 detecting the position signal 206.

Once the registration and tracking service 110 determines an estimated location, the registration and tracking service 110 may provide the location 208 to the UE 106. In some cases, the UE 106 may present the location 208 of the item 104 on a display of the UE 106, for instance, over a map-based interface to assist the user in locating the item 104. In other examples, the registration and tracking service 110 may determine a last known location of the location tracking device 102 based on a last received position signal 206 if, for instance, the location tracking device 102 does not respond to the position request 204. In some examples, the user may define customizable locations, such as home, office, etc. that are considered normal locations for the location tracking device 102 that may not trigger a lost item inquiry by the registration and tracking service 110.

In another implementation, the registration and tracking service 110 may perform active monitoring of the location of the location tracking device 102 on behalf of the user. For example, once the direct wireless connection between the registration and tracking service 110 and the location tracking device 102 is established, the location tracking device 102 may send the position signal 206 at periodic or regular intervals in lieu of or in addition to responding to position requests by the registration and tracking service 110. The registration and tracking service 110 may determine a region or regions associated with the item 104 based on the position signals 206 received over time. The registration and tracking service 110 may then generate an alert 210 for the user when the location tracking device 102 either fails to provide more than a threshold number of periodic position signals 206 and/or the estimated location of the location tracking device 102 is outside of the determined region or regions. In some cases, the regions may be associated with particular times of day, days of the week, and the like.

Figure 3:
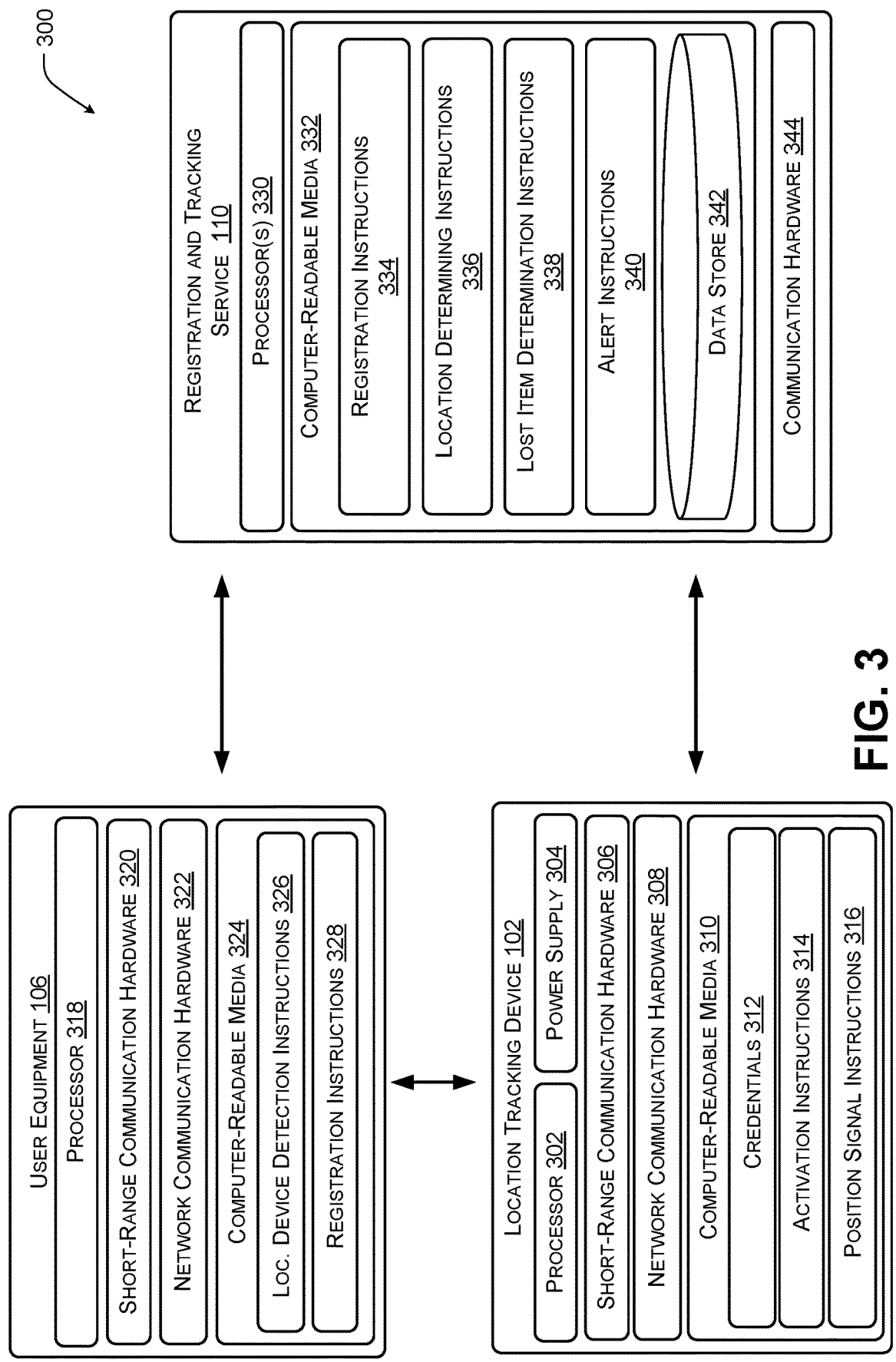
FIG. 3 illustrates an example hardware associated with the location tracking device and registration and tracking system of FIGS. 1 and 2, in accordance with some examples of the present disclosure.

FIG. 3 illustrates an example hardware associated with the location tracking device and registration and tracking system of FIGS. 1 and 2, in accordance with some examples of the present disclosure. In the current example, the location tracking device 102, the UE 106, and registration and tracking service 110 correspond to the location tracking device 102, the UE 106, and registration and tracking service 110 described above with reference to FIGS. 1 and 2.

In at least one example, the location tracking device 102 may including, but is not limited to, Internet of Things (IoT) devices and/or another electronic device that is capable of transmitting or receiving data via a network(s) (e.g., cellular network(s), wireless network(s), etc.). In at least one example, the location tracking device 102 can include processor(s) 302, a power supply 304, short-range communication hardware 306 (e.g., Wi-Fi, Bluetooth®, etc.), and/or network communication hardware 308 (e.g., 2G, 3G, 4G LTE, etc.), and computer-readable media 310.

The processor(s) 302 can represent, for example, a central processing unit (CPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In various embodiments, the processor(s) 302 can execute one or more modules, instructions sets, and/or processes to cause the location tracking device 102 to perform a variety of functionalities, as set forth above and explained in further detail in the following disclosure. Additionally, each of the processor(s) 302 may possess its own local memory, which also can store program modules, program data, and/or one or more operating systems.

The short-range communication hardware 306 provides wireless location tracking device 102 capabilities, such as connecting to the UE 106, or other network connection devices, associated with a Wi-Fi, device to device, or Bluetooth® network or other types of short-range wireless networks. The network communication hardware 308 provides wireless location tracking device 102 capabilities, such as connecting to a base station, or other network connection devices, associated with a cellular or mobile network or other wireless networks. In at least one example, the network communication hardware 308 can include radio hardware, which can include or be incorporated into processors, ASICs, programmable circuits such as FPGAs, or in other ways.

Depending on the exact configuration and type of the location tracking device 102, the computer-readable media 310, may include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile discs (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media 310 can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 310 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the location tracking device 102. Any such non-transitory computer-readable media can be part of the location tracking device 102.

The computer-readable media 310 can include one or more modules and data structures including, for example, credentials 312 (e.g., device identification credentials and/or network access credentials), registration instructions 314 (this is referred to as activation instructions on the PDF), and position signal instructions 316. The one or more modules, instruction sets, and data structures can be in the form of stand-alone applications, productivity applications, an operating system component, or any other application or software module configured to perform operations as described herein.

The registration instructions 314 may be executed by the processor 302 in response to detecting an activation signal, such as detection of a coupling of the power supply 304 to the processor 302. The registration instructions 314 may cause the device 102 enter a discoverable mode or otherwise broadcast a pairing signal to nearby devices, such as the UE 106, via the short-range communication hardware 306. The registration instructions 314 may then be configured to establish a communication connection via the short-range communication hardware 306 with the nearby device and to receive from the nearby device the device identification credentials and/or network access credentials to be stored in the computer-readable media 310 as the credentials 312. In some cases, the registration instructions 314 may also cause the location tracking device 102 to establish a connection with a network, such as a cellular or mobile network, via the network communication hardware 308 using the received credentials 312, as discussed herein.

In some examples, the position signal instructions 316 may be configured to cause the location tracking device 102 to transmit or send position signals detectable by network connection devices (e.g., network connection devices 114 of FIGS. 1 and 2) such that the registration and tracking service 110 is able to determine an estimated location of the location tracking device 102. In some cases, the position signals may be periodic or at regular intervals while in other cases the position signals may be transmitted in response to receiving a request via the network connection hardware 308, as discussed herein.

In at least one example, the UE 106 can correspond to various types of UE including, but not limited to, smart phones, personal digital assistants, netbooks, laptop computers, smart appliances, Internet of Things (IoT) devices and/or another electronic devices that are capable of transmitting or receiving audio, video, and/or data via one or more network(s). In at least one example, the UE 106 can include processor(s) 318, short-range communication hardware 320 (e.g., Wi-Fi, Bluetooth®, etc.), and/or network communication hardware 322 (e.g., 2G, 3G, 4G LTE, etc.), and computer-readable media 324.

The processor(s) 318 can represent, for example, a CPU-type processing unit, a GPU-type processing unit, a FPGA, another class of DSP, or other hardware logic components that can, in some instances, be driven by a CPU. For example, and without limitation, illustrative types of hardware logic components that can be used include ASICs, ASSPs, SOCs, CPLDs, etc. In various embodiments, the processor(s) 318 can execute one or more modules and/or processes to cause the UE 106 to perform a variety of functionalities, as set forth above and explained in further detail in the following disclosure. Additionally, each of the processor(s) 318 can possess its own local memory, which also can store program modules, program data, and/or one or more operating systems.

The short-range communication hardware 320 provides wireless UE 106 capabilities, such as connecting to the location tracking device 102, or other network connection devices, associated with a Wi-Fi, device to device, or Bluetooth® network or other types of short-range wireless networks. The network communication hardware 322 provides wireless UE 106 capabilities, such as connecting to a base station, or other network connection devices, associated with a cellular or mobile network or other wireless networks. In at least one example, the network communication hardware 322 can include radio hardware, which can include or be incorporated into processors, ASICs, programmable circuits such as FPGAs, or in other ways.

Depending on the exact configuration and type of the UE 106, the computer-readable media 324, can include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to RAM, SRAM, DRAM, PRAM, ROM, EPROM, EEPROM, flash memory, CD-ROM, DVDs, optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 324 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the UE 106. Any such non-transitory computer-readable media can be part of the UE 106.

The computer-readable media 324 can include one or more modules, instruction sets, and data structures including, for example, location device detection instructions 326 and registration instructions 328. The one or more modules and data structures can be in the form of stand-alone applications, productivity applications, an operating system component, or any other application or software module configured to perform operations as described herein.

The location device detection instruction 326 may be configured to detect the proximity of the location tracking device 102 when activated and/or broadcasting. In some cases, the location device detection instructions 326 may cause the UE 106 to pair or otherwise establish a short-range communication connection with the location tracking device 102 via the short-range communication hardware 320.

The registration instruction 328 may be configured to notify the registration and tracking service 110 as to the presence and activation of the location tracking device 102. For example, the registration instructions 328 may provide a registration request to the registration and tracking service 110 which may cause the registration and tracking service 110 to generate and assign the location tracking device with credentials to access the cellular or mobile network associated with the user's account and the UE 106. In some cases, once registered (e.g., the location device 102 is added to the user's account), the registration instruction 328 may send the credentials to the location tracking device 102 such that the location tracking device may establish a direct connection to the cellular or mobile network. In some examples, the registration instruction 328 may be configured to register the location tracking device 102 with multiple cellular or mobile networks by sending multiple registration requests.

In at least one example, the registration and tracking service 110 may be a cloud-based service provided via the network connection devices and/or additional hardware associated with one or more network providers. Again, the processor(s) 330 can represent, for example, a CPU-type processing unit, a GPU-type processing unit, a FPGA, another class of DSP, or other hardware logic components that can, in some instances, be driven by a CPU. For example, and without limitation, illustrative types of hardware logic components that can be used include ASICs, ASSPs, SOCs, CPLDs, etc. In various embodiments, the processor(s) 330 can execute one or more modules and/or processes to cause the registration and tracking service 110 to perform a variety of functionalities, as set forth above and explained in further detail in the following disclosure. Additionally, each of the processor(s) 330 can possess its own local memory, which also can store program modules, program data, and/or one or more operating systems.

Depending on the exact configuration and type of the hardware associated with the registration and tracking service 110, the computer-readable media 332, can include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to RAM, SRAM, DRAM, PRAM, ROM, EPROM, EEPROM, flash memory, CD-ROM, DVDs, optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 332 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the processors 330. Any such non-transitory computer-readable media can be part of the registration and tracking service 110.

The computer-readable media 332 can include one or more modules, instruction sets, and data structures including, for example, registration instructions 334, location determining instructions 336, lost item determination instructions 338, and alert instructions 340 as well as one or more data storage 342 for storing information and data associated with the UEs and location tracking devices, such as last known location, credentials, account data, etc. The one or more modules and data structures can be in the form of stand-alone applications, productivity applications, an operating system component, or any other application or software module configured to perform operations as described herein.

The registration instructions 334 may be configured to receive registration requests from the UE 106 and determine an account of the associated with the user and/or the UE 106 with the cellular or mobile network provider. The registration instructions 334 may also generate unique device identification credentials for the location tracking device 102 and add the location tracking device 102 as an authorized device under the account of the user, as discussed above. The registration instructions 334 may then transmit the device identification credentials as well as network access credentials to the UE 106 via the communication hardware 344. In some cases, the registration instructions 334 may then cause a direct communication connection to be established between the registration and tracking service 110 (and/or the cellular network associated with the registration and tracking service 110) and the location tracking device 102 upon receiving the request for a connection from the location tracking device 102 including the device identification credentials and/or the network access credentials.

The location determining instructions 336 may be configured to determine a location of the location tracking device 102 based on one or more position signals output by the location tracking device 102. In some cases, the location determining instructions 336 may estimate a location of the location tracking device 102 in response to receiving a request from a UE, such as UE 106. In other cases, the location determining instructions 336 may estimate the location on a regular basis to store or maintain a last known location of the location tracking device 102 in the data storage 342.

The lost item determination instructions 338 may be configured to determine based on the estimated location of the location tracking device 102 that the item associated with the location tracking device 102 may be lost, as the location tracking device 102 is outside of a normal region or regions. In some cases, the lost item determination instructions 338 may determine the item is lost if the location tracking device 102 remains outside the known region for greater than a predetermined period of time. In yet another example, the lost item determination instructions 338 may determine the item is lost if the location of the location tracking device 102 is greater than a predetermined distance from any known UE 106 of the user for greater than the predetermined period of time.

The alert instructions 340 may be configured to generate an alert to send to the UE 106 to cause the user to be informed as the potential that the item is lost and the last known location of the item. In some cases, the alert may cause the UE 106 to notify the user as to the potentially lost item and to, for example, display a map indicating a predicted or last known location of the item.

The network communication hardware 344 provides capabilities, such as connecting to various UE or location tracking devices via the cellular or mobile network or other wireless networks. In at least one example, the network communication hardware 344 can include radio hardware, which can include or be incorporated into processors, ASICs, programmable circuits such as FPGAs, or in other ways.

FIGS. 4-7 are flow diagrams illustrating example processes associated with the location tracking device 102 of FIGS. 1-3 according to some implementations. The processes are illustrated as a collection of blocks in a logical flow diagram, which represent a sequence of operations, some or all of which can be implemented in hardware, software, or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 4:
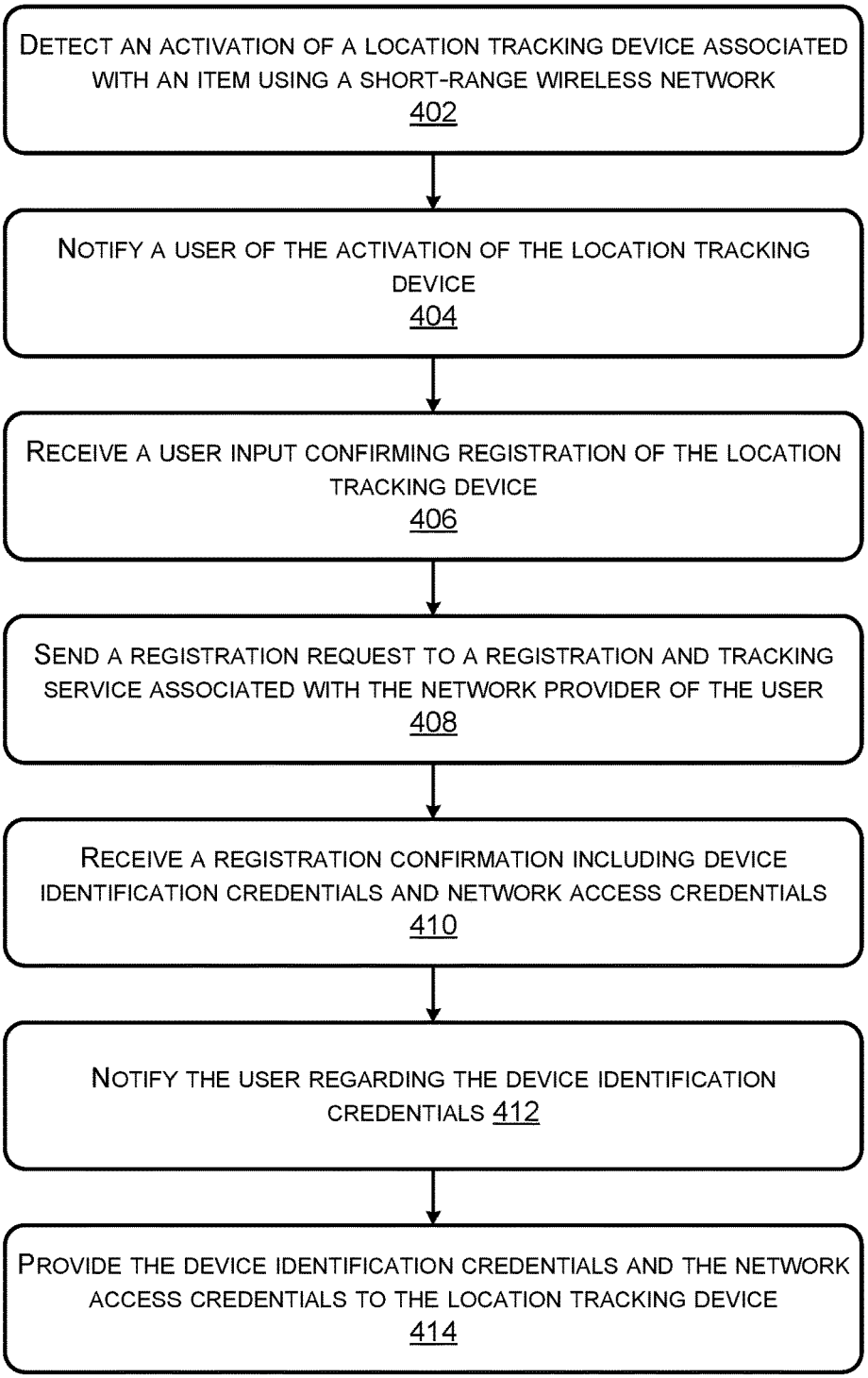
FIG. 4 illustrates an example flow diagram showing an illustrative process for registering a location tracking device with a cellular or mobile network, in accordance with some examples of the present disclosure.

FIG. 4 illustrates an example flow diagram showing an illustrative process 400 for registering a location tracking device with a cellular or mobile network, in accordance with some examples of the present disclosure. As discussed above, a location tracking device may be affixed to an item, such as clothing, accessories, vehicles, or other high value merchandise, at the time of manufacturing. In some cases, the location tracking device may be affixed to the item in a manner such that the location tracking device cannot be removed without damage to the item. In some implementations, the location tracking device may be disabled until activated by the user/purchaser of the item. When ready (such as at home after shopping), the user may activate the location tracking device associated with the item. For example, the user may activate the location tracking device via a onetime actuatable or mechanical trigger or via one or more buttons.

At 402, a UE in proximity to the location tracking device may detect an activation of the location tracking device associated with the item using a short-range wireless network. For example, when activated the location tracking device may broadcast in a discoverable mode over a predetermined short-range wireless connection protocol. The UE may detect the broadcast over the predetermined short-range wireless connection protocol and pair or otherwise establish a wireless connection with the location tracking device.

At 404, the UE may notify a user of the activation of the location tracking device. For example, the UE may emit an audible sound, display a visual icon, or provide a mechanical output (such as a vibration). In some cases, the notification may request that the user of the UE download an applicable application for completing the registration of the location tracking device with the cellular or mobile network and/or access a particular web-based service or portal to complete the registration of the location tracking device with the cellular or mobile network.

At 406, the UE may receive a user input confirming the registration of the location tracking device. In some cases, the user may input a name of the item, user account information, etc. that may be used to register the location tracking device with the cellular or mobile network. For instance, the name may be used by the UE and/or the user to identify which item an alert or estimated location is associated with.

At 408, the UE may send a registration request to a registration and tracking service associated with the cellular or mobile network provider of the UE and/or the user. In some cases, the registration request may include the name, user information, or other identifiers provided by the location tracking device.

At 410, the UE may receive a registration confirmation including a device identification credential and/or a network access credentials. For example, a registration and tracking service may also generate unique device identification credentials for the location tracking device and/or the item as part of the registration process. In some cases, the device identification credentials may be generated as a fixed length identifier and may be formed based on combination of one or more of a device identifiers, account data, item information, the name, user information, and/or a registration device identifier. The registration and tracking service may also generate network access credentials that the cellular or mobile network may use to authenticate the location tracking device and allow the location tracking device to access the network. In some cases, the network access credentials may be unique to the location tracking device and/or may differ from the user's account name and password to prevent theft of and unauthorized access to the account via the user's account name and password.

At 412, the UE may notify the user regarding the device identification credentials. For example, the UE may associate the device identification credentials with the name the user entered for the item.

At 414, the UE may provide the device identification credentials and/or the network access credentials to the location tracking device. As will be discussed in more detail below with respect to FIG. 5, the location tracking device may then establish a direct wireless connection with the cellular or mobile network using the device identification credentials and/or the network access credentials. It should be understood that since the device identification credentials and the network access credentials are generated during registration rather than preprogrammed and/or stored on the location tracking device during manufacturing, the location tracking device may be associated with one or more networks of choice by the user. In other words, different users who have accounts with different network providers may both cause the location tracking device to establish connections with their respective network providers.

In one specific example, the registration and tracking service may be associated with multiple network providers, such that the registration and tracking service may register and/or generate credentials for the location tracking device with multiple network providers. In this manner, the location tracking device may establish communication connections with multiple networks to further increase the tracking ability associated with the system. In some cases, the location tracking device may be provided access or credentials for multiple network providers provided the user has an account with one of the approved network providers.

Figure 5:
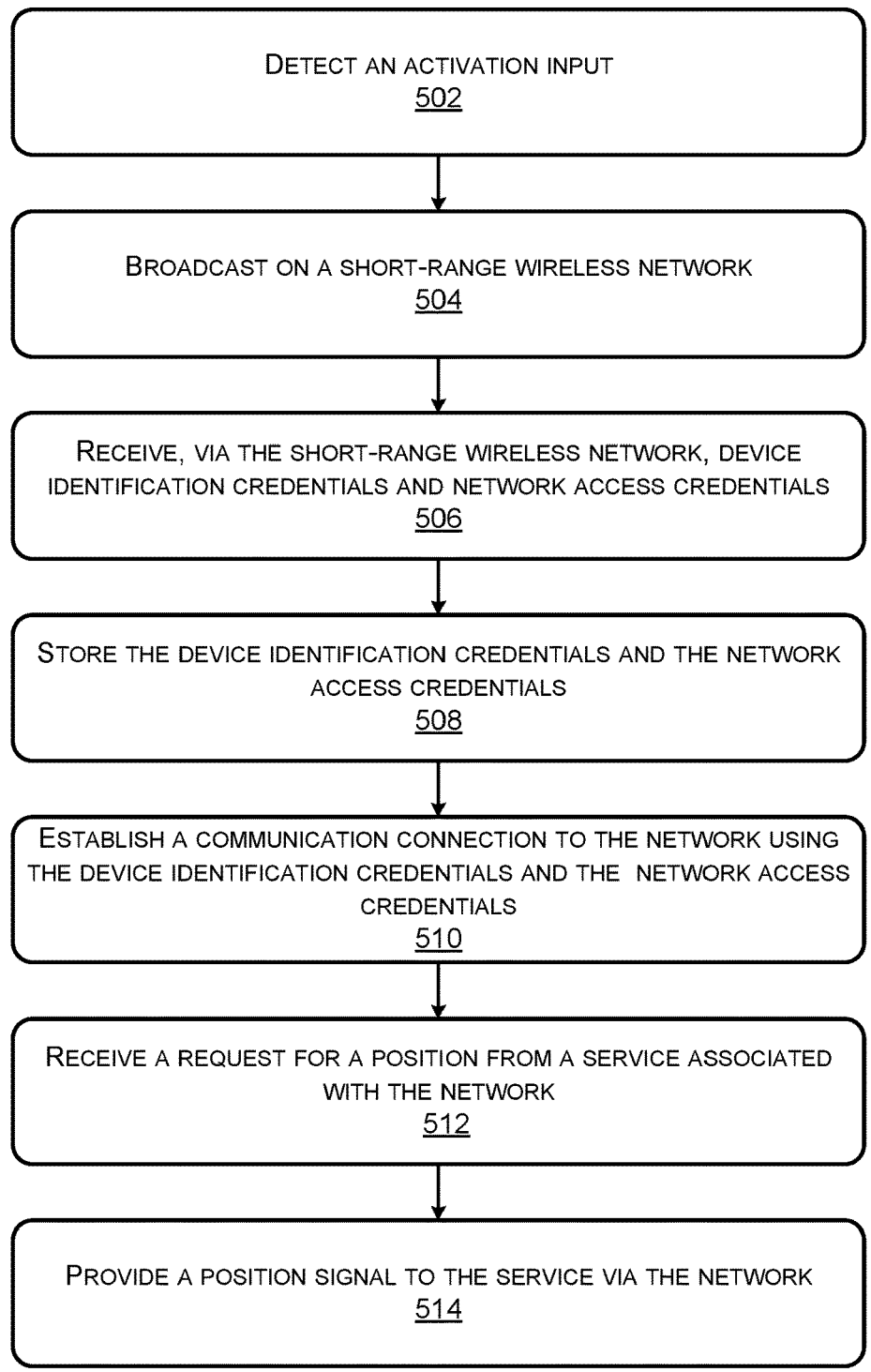
FIG. 5 illustrates another example flow diagram showing an illustrative process for registering a location tracking device with a cellular or mobile network, in accordance with some examples of the present disclosure.

FIG. 5 illustrates another example flow diagram showing an illustrative process 500 for registering a location tracking device with a cellular or mobile network, in accordance with some examples of the present disclosure. As discussed above, a location tracking device may be affixed to an item, in a manner such that the location tracking device cannot be removed without damage to the item. In some implementations, the location tracking device may be disabled until activated by the user/purchaser of the item.

At 502, the location tracking device may receive an activation input. For example, when ready, the user may activate the location tracking device associated with the item. For example, the user may activate the location tracking device via a onetime actuatable or mechanical trigger or via one or more buttons. For example, the location tracking device may be equipped with a pullable or tearable tab that may be removed through at least a portion of the item and, thereby, cause the device to activate. In this manner, the location tracking device cannot be later deactivated or detected if stolen.

At 504, the location tracking device may broadcast on a short-range wireless network. For example, the location tracking device may enter a discoverable mode in which the user may access or establish a short-range wireless connection with the location tracking device via a UE. In this manner, the user may then register the location tracking device with a cellular or mobile network provider associated with the user, as discussed above in more detail with respect to FIG. 4.

At 506, the location tracking device may receive, via the short-range wireless network, device identification credentials and/or network access credentials. For example, the UE may provide the device identification credentials and/or the network access credentials received from the network provider to the location tracking device.

At 508, the location tracking device may store the device identification credentials and/or the network access credentials. For example, the location tracking device may store the device identification credentials and/or the network access credentials in order to establish or re-establish connections to the cellular or mobile network provider.

At 510, the location tracking device may establish a communication connection to the network using the device identification credentials and the network access credentials. For example, the location tracking device may utilize network communication hardware to connect with the cellular or mobile network associated with the user. In some cases, the location tracking device may authenticate with the cellular or mobile network using the device identification credentials and the network access credentials.

At 512, the location tracking device may receive a request for a position from a service associated with the network, and at 514, the location tracking device may provide a position signal to the service via the cellular or mobile network. For example, the location tracking device may receive a position request from a registration and tracking service. In some cases, the position request may be responsive to a request by the user via a UE.

Figure 6:
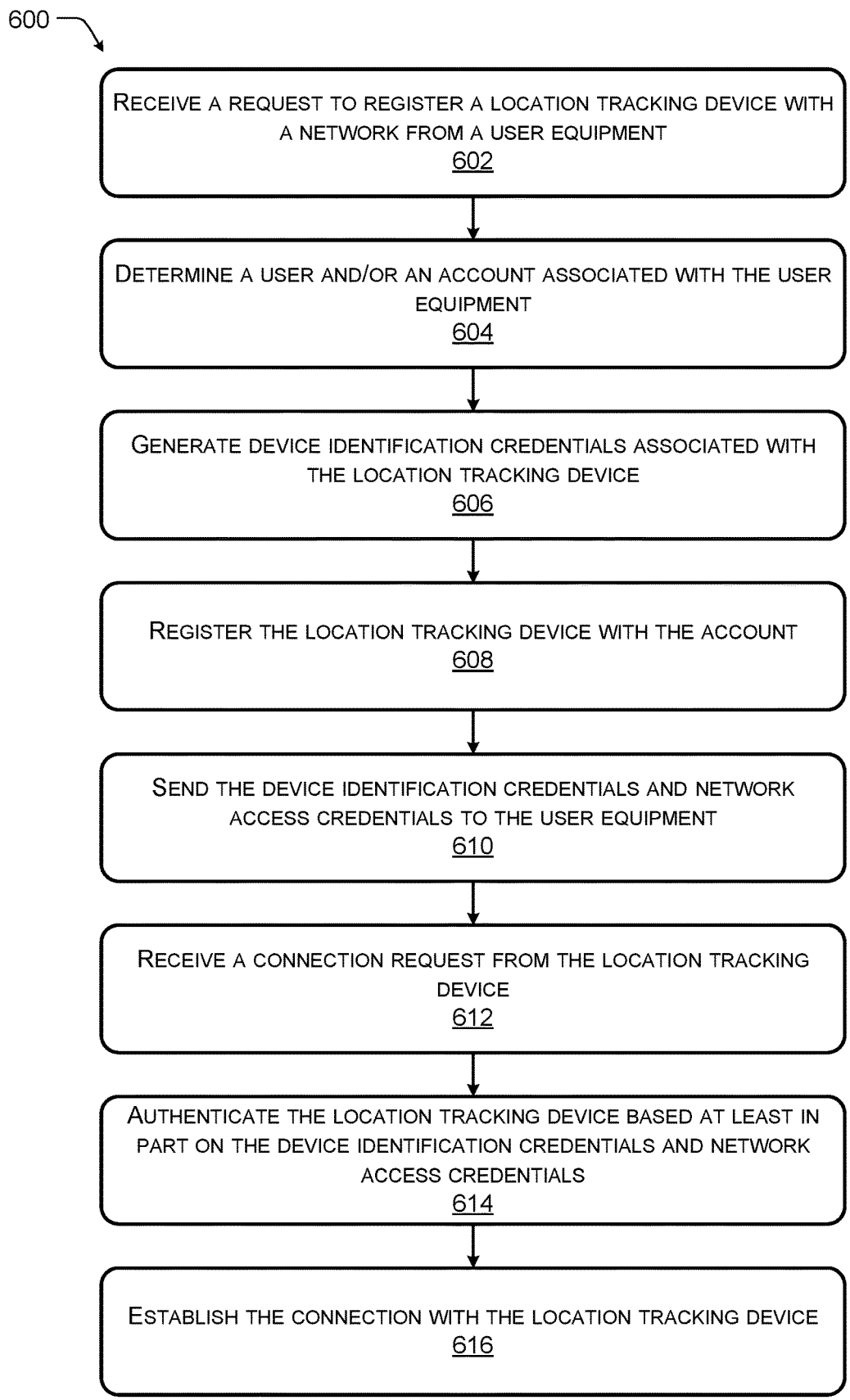
FIG. 6 illustrates yet another example flow diagram showing an illustrative process for registering a location tracking device with a cellular or mobile network, in accordance with some examples of the present disclosure.

FIG. 6 illustrates yet another example flow diagram showing an illustrative process 600 for registering a location tracking device with a cellular or mobile network, in accordance with some examples of the present disclosure. As discussed above, a UE may be used to register the location tracking device affixed to an item to the cellular and/or mobile provider network of the user.

At 602, a registration and tracking service associated with a cellular or mobile network provider may receive a request to register the location tracking device with a network from the UE. For example, the UE may be associated with the user that purchased the item. The UE may establish a short-range wireless connection with the location tracking device and act as a middle device between the registration and tracking service and the location tracking device during registration. In some cases, the request to register the location tracking device may include a data related to the location tracking device and/or the item to which the location tracking device is affixed.

At 604, the registration and tracking service may determine a user and/or an account associated with the user equipment. For example, the registration and tracking service may identify an account associated with the UE sending the registration request. In other examples, the account may be identified in the registration request itself.

At 606, the registration and tracking service may generate device identification credentials associated with the location tracking device. The device identification credentials may be a unique identifier for the location tracking device. In some cases, the device identification credentials may be generated to a fixed length identifier and may be formed based on combination of one or more of a device identifier, account identifier, and/or a registration device identifier. For example, the device identification credentials may include a unique identifier concatenated with an account number (or portion of an account number).

At 608, the registration and tracking service may register the location tracking device with the account. For example, the registration and tracking service may add the locating tracking device to a list of authorized devices that may utilize the network under the rights of the account.

At 610, the registration and tracking service may send the device identification credentials and network access credentials to the UE. For example, the network access credentials may be specific for the location tracking device and allow the location tracking device to configure, connect, and maintain an authorized direct connection to the cellular or mobile network.

At 612, the registration and tracking service may receive a connection request from the location tracking device. For example, the location tracking device may receive the network access credentials from the UE over the short-range wireless connection. The location tracking device may then self-configure and send a connection request to the registration and tracking service associated with the network to establish a direct connection to the network via one or more network connection devices, such as a cellular tower.

At 614, the registration and tracking service may authenticate the location tracking device based at least in part on the device identification credentials and the network access credentials, and, at 616, the registration and tracking service may establish the connection with the location tracking device. For example, the registration and tracking service may determine that the location tracking device is authorized to access the network using the network access credentials and that the location tracking device is the device associated with the user account using the device identification credentials.

Figure 7:
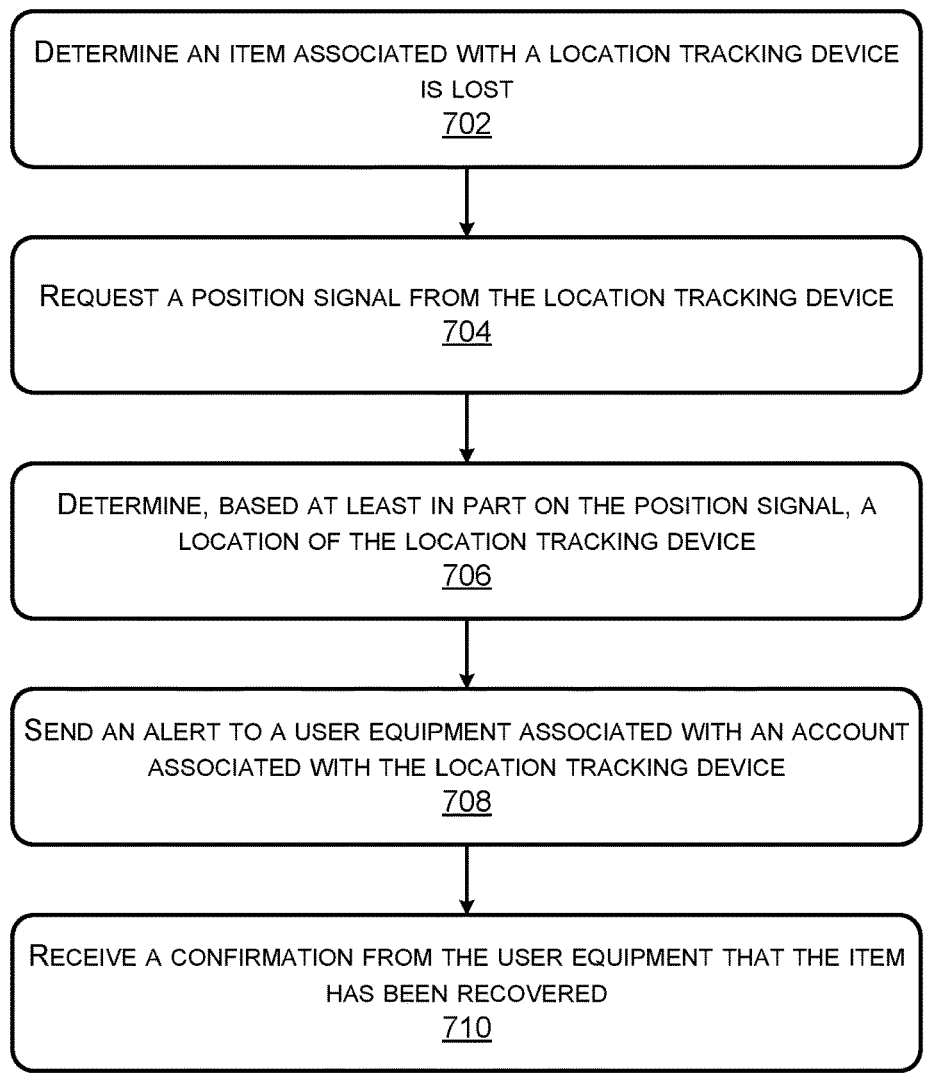
FIG. 7 illustrates an example flow diagram showing an illustrative process for determining and alerting a user that an item may be lost, in accordance with some examples of the present disclosure.

FIG. 7 illustrates an example flow diagram showing an illustrative process 700 for determining and alerting a user that an item may be lost, in accordance with some examples of the present disclosure. For instance, once the direct connection between the network and the location tracking device is established, the network may determine the location or position of the device at various intervals, such as every 1 second, 5 seconds, 10 seconds, 15 seconds, etc. In other cases, the network may determine the location or position of the device at larger intervals, such as hourly, daily, weekly, etc.

At 702, the network and/or registration and tracking service may determine that an item associated with a location tracking device is lost or stolen. For example, the registration and tracking service may fail to receive an expected position signal from the location tracking device or be unable to communicate with the location tracking device. In some cases, the registration and tracking service may determine the item is lost when the registration and tracking service fails to receive a predetermined number of position signals or if the location tracking device is out of communication with the registration and tracking service for greater than a predetermined period of time.

In still other examples, the registration and tracking service may determine an item is lost in response to receiving a request from a UE associated with the user of the account. In other cases, the registration and tracking service may determine the item is lost if the item is outside of a determined region associated with the object, such as the home, office, etc. of the user for greater than a predetermined period of time.

At 704, the registration and tracking service may request a position signal from the location tracking device. For example, the registration and tracking service may request the position signal to determine a location of the device in response to notification from the UE that the item is lost.

At 706, the registration and tracking service may determine, based at least in part on the position signal, a location of the location tracking device. In some cases, the location may be an approximate or estimated location, for instance, determined based on a signal strength of the position signal detected by two or more of network connection devices.

At 708, the registration and tracking service may send an alert to the UE associated with the account associated with the location tracking device. In some cases, the UE may be the UE that sent the request for the location to the registration and tracking service.

At 710, the registration and tracking service may receive a confirmation from the UE that the item has been recovered. For example, the registration and tracking service may receive the confirmation from the UE when the user has found the item. In some cases, the registration and tracking service may provide multiple locations of the item to the UE over a period of time until the confirmation is received. In this manner, the user may, for instance, compare a current location (e.g., the location of the UE) with the location of the item until the item is recovered.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A user equipment (UE) comprising:
   a one or more transceivers to send and receive transmissions over a short-range wireless connection and to send and receive transmissions over a cellular network connection;
   one or more processors;
   non-transitory computer-readable media storing computer-executable instructions, which when executed by the one or more processors cause the one or more processors to perform operations including:
      detecting, via a first transceiver, a presence of a location tracking device in physical proximity to the UE;
      establishing an instance of a short-range connection with the location tracking device;
      sending, via the cellular network connection, a request for network access credentials to a system of a cellular network provider associated with the UE, wherein the request is made on behalf of the location tracking device and the network access credentials are tied to a user account of a user of the UE;
      receiving, from the system via the cellular network connection, the network access credentials; and
      sending, to the location tracking device, the network access credentials.

2. The UE of claim 1, further comprising:
   a user interface (UI) to receive inputs from a user; and
   wherein the operations further comprise:
      receive, via the UI, a user request for a location of the location tracking device;
      sending, via the cellular network connection and in response to the user request, a location request to the system, the location request being for an estimated location of the location tracking device and including the network access credentials;
      receiving, via the cellular network connection, the estimated location of the location tracking device; and
      presenting an indication of the estimated location on the UI.

3. The UE of claim 2, wherein presenting the indication includes presenting a map on the UI and the indication is an indication of a position associated the map.

4. The UE of claim 2, wherein the operations further comprise:
   receiving, via the UI, a user input associated with an item affixed to the location tracking device; and
   wherein the request includes data associated with the user input.

5. The UE of claim 4, wherein the user input includes data associated with at least one of:
   a name associated with the item;
   a type associated with the item;
   a value associated with the item;
   device identification credentials associated with the location tracking device; or
   a designation of a cellular network provider.

6. The UE of claim 1, wherein the one or more transceivers includes a first transceiver to send and receive transmissions over a short-range wireless connection and a second transceiver to send and receive transmissions over a cellular network connection.

7. A method comprising:
   detecting a presence of a location tracking device in physical proximity to a user equipment (UE);
   establishing a short-range connection with the location tracking device;
   sending over a cellular network connection a request to a cellular network provider associated with the UE, wherein the request is made on behalf of the location tracking device;
   receiving, from the cellular network provider, network access credentials for the location tracking device, the network access credentials are tied to a user account of a user of the UE; and
   sending, over the short-range connection, the network access credentials to the location tracking device.

8. The method of claim 7, further comprising:
   receiving, via a user interface, a user input associated with an item affixed to the location tracking device; and
   wherein the request includes data associated with the user input.

9. The method of claim 7, further comprising:
   receiving, via a user interface, a user request for a location of the location tracking device;
   sending, in response to receiving the user request, a location request the cellular network provider;
   receiving, from the cellular network provider, an estimated location of the location tracking device; and
   presenting an indication of the estimated location on the UI.

10. The method of claim 9, wherein presenting the indication of the estimated location on the UI includes presenting a map on the UI and the indication is an indication of a position associated the map.

11. The method of claim 7, further comprising:
   receiving, from the cellular network provider, device identification credentials; and
   sending the device identification credentials to the location tracking device.

12. The method of claim 7, wherein the network access credentials are unique for the location tracking device.

13. A non-transitory computer-readable medium having programming instructions stored thereon that, when executed by a processor, cause the processor to perform operations comprising:

detecting a presence of a location tracking device in physical proximity to a user equipment (UE);

establishing a short-range connection with the location tracking device;

sending over a cellular network connection a request to a cellular network provider associated with the UE, wherein the request is made on behalf of the location tracking device;

receiving, from the cellular network provider, network access credentials for the location tracking device, the network access credentials are tied to a user account of a user of the UE; and sending, over the short-range connection, the network access credentials to the location tracking device.

14. The non-transitory computer-readable medium of claim 13, wherein the operations further comprise:

receiving, via a user interface, a user input associated with an item affixed to the location tracking device; and wherein the request includes data associated with the user input.

15. The non-transitory computer-readable medium of claim 13, wherein the operations further comprise:

receiving, via a user interface, a user request for a location of the location tracking device;

sending, in response to receiving the user request, a location request the cellular network provider;

receiving, from the cellular network provider, an estimated location of the location tracking device; and presenting an indication of the estimated location on the UI.

16. The non-transitory computer-readable medium of claim 15, wherein presenting the indication of the estimated location on the UI includes presenting a map on the UI and the indication is an indication of a position associated the map.

17. The non-transitory computer-readable medium of claim 13, wherein the operations further comprise:

receiving, from the cellular network provider, device identification credentials; and sending the device identification credentials to the location tracking device.

18. The non-transitory computer-readable medium of claim 13, wherein the network access credentials are unique for the location tracking device.

* * * * *